Nov. 10, 1931.  G. M. CRAWFORD ET AL  1,831,096
CONVEYER OPERATING MECHANISM
Filed April 26, 1928   2 Sheets-Sheet 1
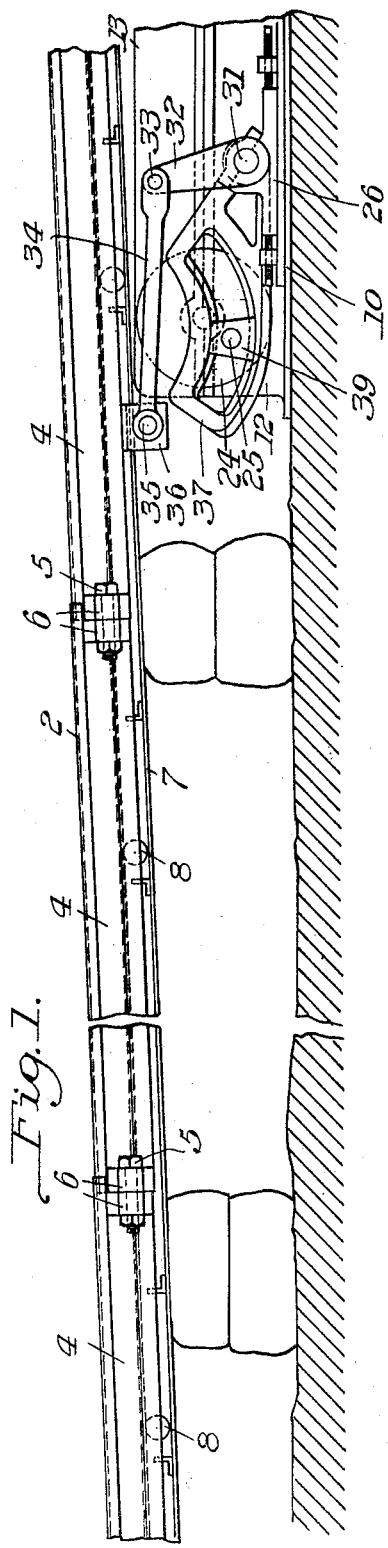
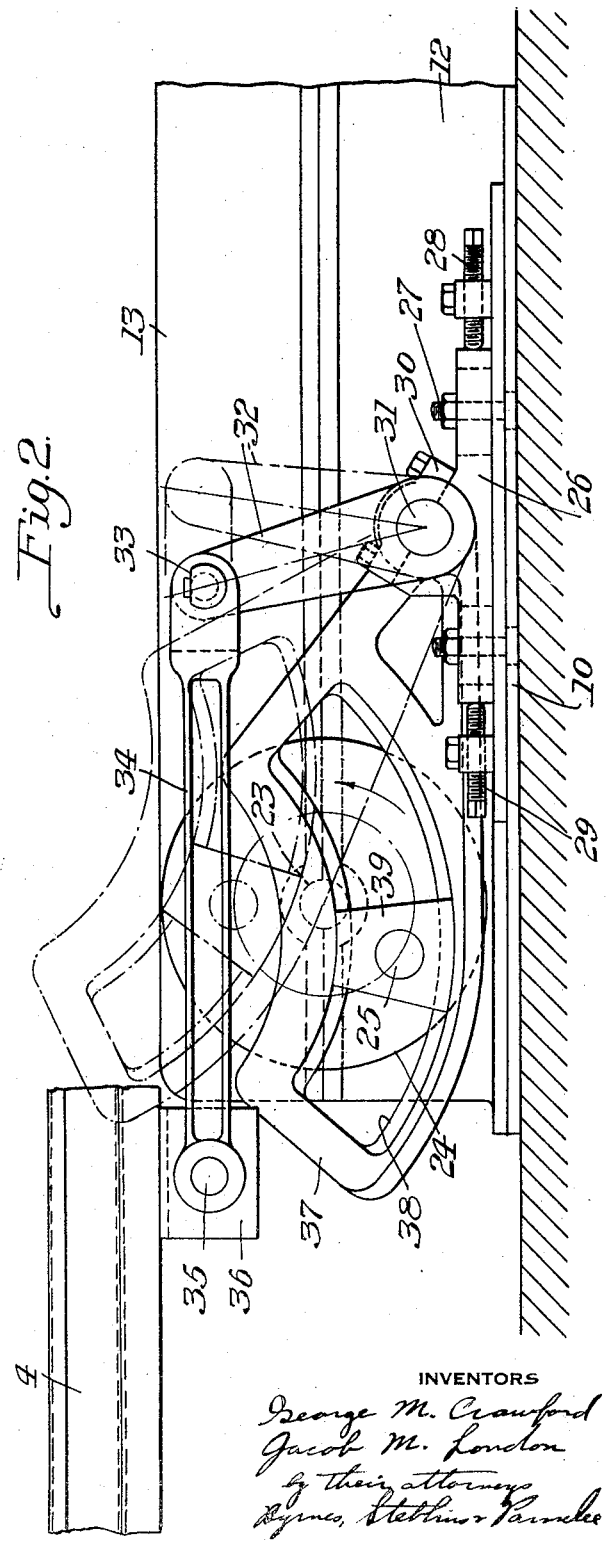
INVENTORS
George M. Crawford
Jacob M. London
by their attorneys

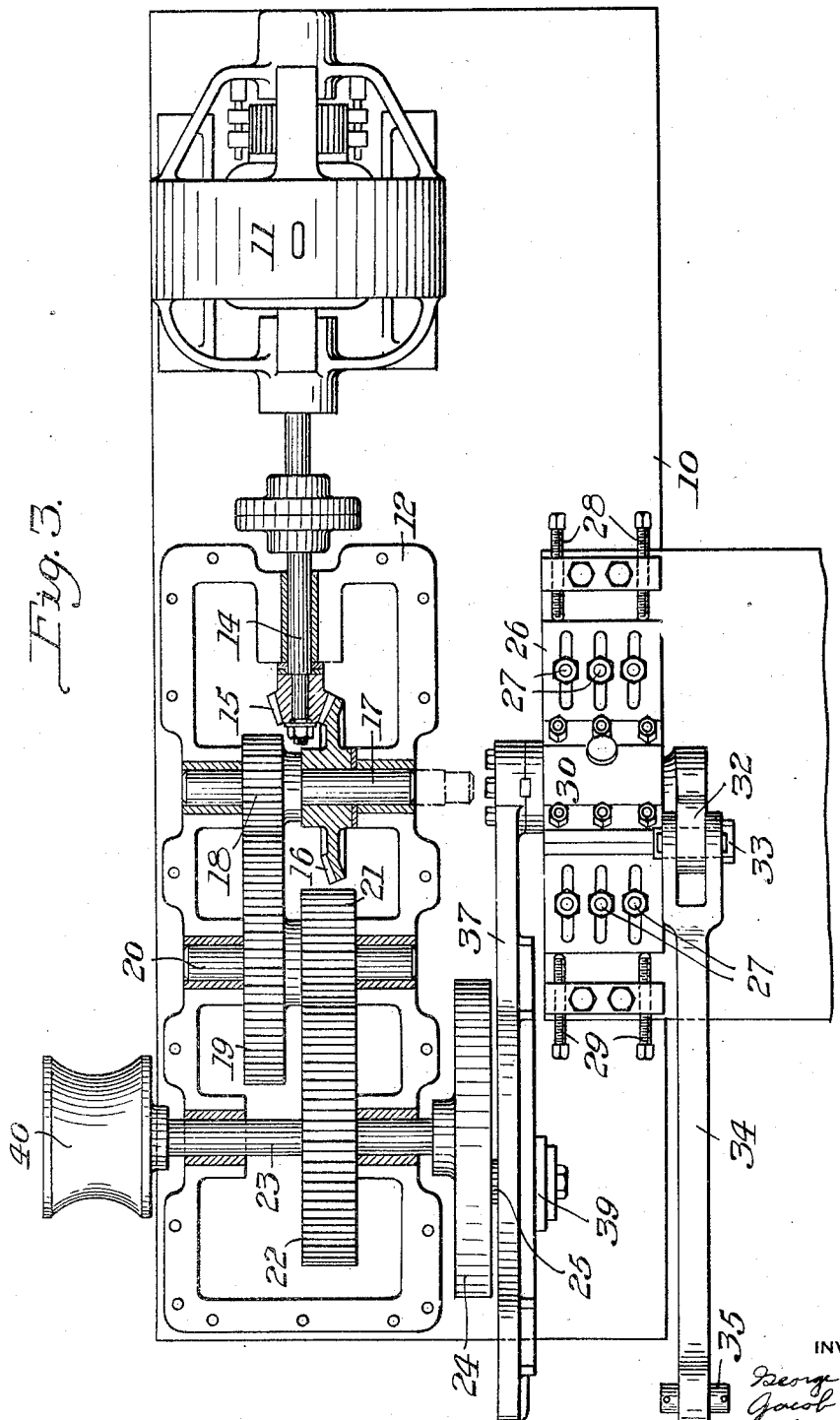

Patented Nov. 10, 1931

1,831,096

UNITED STATES PATENT OFFICE

GEORGE M. CRAWFORD, OF INGOMAR, AND JACOB M. LONDON, OF BUTLER, PENNSYLVANIA

CONVEYER OPERATING MECHANISM

Application filed April 26, 1928. Serial No. 272,906.

This invention relates to conveyers, and especially conveyers of the reciprocating trough type, and is for a driving mechanism for imparting a reciprocating motion to the trough.

Various types of reciprocating trough conveyers have been constructed, but up to the present time the most successful conveyers of this type have required that the trough be given an up and down movement as well as a reciprocating movement longitudinally. Furthermore, such conveyers have not been capable of operating up any very considerable grade. They have been used for the most part in places where the conveyer could have a slight downward pitch in the direction of travel of the material.

According to the present invention, we have provided an operating mechanism for reciprocating the trough so constructed as to give a peculiar reciprocation to the trough, most favorable to advancing the material forwardly in the trough. We have found that with an actuating mechanism of the type disclosed in the present application, that material can be effectively moved on a reciprocating trough without requiring that the trough move up and down, and that material can be moved up 8 and 10% grades under adverse conditions with a high degree of efficiency.

The invention may be readily understood by reference to the accompanying drawings in which Figure 1 represents a side elevation of a reciprocating trough type of conveyer having a driving unit embodying our invention connected thereto;

Figure 2 is a side elevation on a larger scale of the operating devices;

Figure 3 is a plan view of the driving unit with the cover of the gear case removed.

In the drawings, 2 designates the conveyer and 3 is the driving unit. The conveyer may be of any of the usual reciprocating trough types, but we prefer to use the driving unit in combination with the novel form of conveyer disclosed in our copending application Serial No. 292,905, filed April 26, 1928, and have shown such a conveyer in the drawings. The conveyer comprises trough sections 4 having overlapping ends. These sections are rigidly bolted together by means of bolts 5 passing through eyes 6 at the sides of the trough sections. Each conveyer section operates over a track section 7. The track 7 is co-extensive with the length of the conveyer. Operatively disposed between each of the trough sections 4 and the track is a roller 8. The rollers 8 provide a rolling support for the trough by means of which the trough may be easily reciprocated along the track.

The driving unit 3 comprises a base plate 10 which may be conveniently mounted on skids so that it can be moved about. On the base plate 10 is a driving motor 11. Also carried on the base plate is a gear housing 12 having a removable cover 13. The motor 11 drives a shaft 14 on which is a bevel gear 15 meshing with a pinion 16 on a shaft 17. The shaft 17 carries a spur gear 18 meshing with a larger gear 19 on a shaft 20, also contained in the gear housing. On the shaft 20 is a smaller gear wheel 21 that cooperates with a larger gear wheel 22 on a shaft 23. The train of gears just described constitutes a reducing gear between the motor and the shaft 23.

The shaft 23 projects through the housing and on one end thereof is a crank disc 24. Projecting from one face of the crank disc 24 is a crank pin 25. Mounted on the base plate 10 at one side of the gear housing is a bearing 26. This bearing block is secured to the base by means of bolts 27 passing through slots therein into the base of the machine. Horizontally arranged bolts 28 and 29 bearing against opposite ends of the block 26 provide for the longitudinal adjustment of the block. The bearing block 26 is povided with a split bearing 30 in which is a crank shaft 31. On one end of the crank shaft 31 is a vertically extending crank arm 32. The upper end of the crank arm 32 is pivotally connected at 33 with one end of a link 34. The other end of the link 34 is pivotally connected at 35 with a lug 36 secured to the bottom of one of the conveyer sections 4.

Carried on the other end of the crank shaft 31 is a lever or crank arm 37 having a curved slot 38 therein. The sides of the slot 38 are machined to provide a guide-way along which a bearing block 39 on the crank pin 25 may move.

When the crank disc 24 rotates the pin 25 travels in a circle. Motion is transmitted from the crank pin through the block 39 to the lever arm 37 to raise and lower this arm, thereby operating the lever 32 to reciprocate the link 34, and thus operate the conveyer.

An important feature of the present invention resides in the provision of a curved slot 38 in the arm 37. In Fig. 2 the full line position of the arm 37 is the lowermost position of this arm and the broken line position is the uppermost limit of movement of this arm. If the slot 38 were straight, it will be seen that starting with the arm in its lowermost position and the disc travelling in an anti-clockwise direction, that as the crank pin 25 moved from its lowermost position through an arc of 90°, it would be moving toward the axis of the shaft 31, thereby giving the greatest acceleration to lift the arm 37 during its travel from the lowermost position through an arc of 90°. In the next 90° of movement, the pin 25 would be moving away from the center about which the arm 37 rotates, thereby lifting the arm with a decelerated motion until the pin 25 reached its uppermost limit of movement. Thus with a straight slot in the crank arm 37, the trough 4 would move with accelerated speed through the first half of its travel and with decelerated speed through the last half of its travel in one direction.

By reason of the curvature of the slot 38, the crank pin 25 exercises, through the block 39, only a very small lifting movement of the arm in moving from the full line position, shown in Figure 2, to a position 90° therefrom, the disc rotating in the direction of the arrow. This is because the curvature of the slot approaches the arc of travel of the pin 25 although it does not coincide therewith. In the next 90° of movement, the curvature of the slot is reversed to the path of travel of the pin 25. Therefore, even though the pin is moving away from the point about which the lever arm 37 rotates, the reversed curvature of the slot more than offsets the reduced lifting rate caused by the pin moving away from the center with the result that the arm 37 is lifted with a continuously accelerated movement from its lowermost position to the uppermost position, and the greatest rate of movement is concentrated in the last 90° of rotation of the disc. This means that the trough 4 is reciprocated in one direction at a correspondingly increasing rate, starting forward slowly and moving through the latter part of its motion at a high rate. This throws the contents of the conveyer forwardly. On the down stroke of the arm 37, the curvature of the slot 38 is, in the first 90° of movement, reversed to the arc through which the pin 25 is moving, and in the second 90° of movement the curvature of the slot again tends to coincide with the direction of travel of the crank pin. This means that the arm 37 is lowered with a gradually decelerated speed, whereby there is a quick reversal in the movement of the trough 4 and a gradual slowing down during the backward movement until the point of reverse is again reached. This condition is desirable because the greatest retracting movement of the conveyer occurs before the coal or other material being conveyed has overcome the inertia of movement in the forward direction.

It has been found that the curvature of the slot in this manner very materially increases the efficiency of conveyers of this type. In coal mines, it has been experimentally operated with a high degree of success in conveying wet coal up a grade slightly greater than 8%, the trough of the conveyer having only the reciprocating motion herein described and having no vertical movement.

By loosening the bolts 27 and adjusting the bolts 28 and 29, the bearing block 26 can be shifted with respect to the crank disc 24 to change the effective stroke of the conveyer. This adjustment is made according to the grade at which the conveyer is operating and the nature of the material being handled.

With the particular conveyer illustrated, the most desirable results are secured by attaching the link 34 to the middle of the center of the conveyer so that the line of pull is along the line of the center of the conveyer.

On the other end of the shaft 23 there may be provided a friction drum 40. A rope may be passed around this drum with one end of the rope secured to a fixed support by means of which the unit may be caused to pull itself over the ground. This drum may also be used in pulling other things around, and is particularly convenient in mines where the drum can be used for dragging other conveyer sections into place and otherwise doing work for which a winch is generally provided.

The motor 11 is preferably a reversing motor, as it has been found that by reversing the direction of rotation of the disc 24 the conveyer will effectively operate in the reverse direction. This is unique in conveyers of this type, and is quite convenient where the conveyer is used in a mine because the conveyer will not only operate to move material away from the working face of the mine, but can be used to carry props and construction materials to the working face.

While we have shown and described a specific embodiment of our invention, it will be understood that the invention may be otherwise embodied and that various changes and modifications may be made in the construction shown within the contemplation of our invention and under the scope of the following claims.

We claim:

1. A driving unit for a reciprocating conveyer comprising a base plate, a gear housing on the base plate having a reducing gear thereon, a shaft projecting through said housing driven by said reducing gear, and having a disc thereon outside the housing, a crank pin on the disc, a bearing block on the base plate, a second shaft in the bearing block, a lever arm on said second shaft having a slot therein in which said crank on the disc operates, a second lever on the second shaft, a link on said second lever for connection with a conveyer, and a motor on said base operatively connected with the reducing gear in the gear housing.

2. A driving unit for a reciprocating conveyer comprising a base plate, a gear housing on the base plate having a reducing gear thereon, a shaft projecting through said housing driven by said reducing gear, and having a disc thereon outside the housing, a crank pin on the disc, a bearing block on the base plate, a second shaft in the bearing block, a lever arm on said second shaft having a slot therein in which said crank on the disc operates, a second lever on the second shaft, a link on said second lever for connection with a conveyer, and a motor on said base operatively connected with the reducing gear in the gear housing, said first named shaft also having a friction drum thereon outside the gear housing.

3. The combination with a conveyer comprising a trough, a track substantially co-extensive with the trough and rollers operatively disposed between the trough and the track and movable along flat surfaces on the track, of a driving unit including an eccentric crank, a lever arm having a curved surface thereon for cooperation with the crank, and an operating connection between the lever arm and the trough.

4. The combination with a longitudinally reciprocable inclined trough conveyer, of an operating mechanism comprising a crank, an arm having a curved slide in which the crank operates, a second arm connected with the first, and means for transmitting reciprocating motion from the second arm to the trough the trough being at the lower limit of its inclined travel when the crank is at an intermediate point in the curved slide and at a time when the curvature of the slide most nearly coincides with the path of travel of the crank, whereby the direction of movement is more abruptly reversed at the upper limit of inclined travel of the trough conveyer than at the lower limit.

In testimony whereof we have hereunto set our hands.

GEORGE M. CRAWFORD.
JACOB M. LONDON.

CERTIFICATE OF CORRECTION.

Patent No. 1,831,096.                          Granted November 10, 1931, to

GEORGE M. CRAWFORD ET AL.

It is hereby certified that error appears in the printed specification of the above numbered patent requiring correction as follows: Page 1, line 48, for the numeral "292,905" read 272,905; and that the said Letters Patent should be read with this correction therein that the same may conform to the record of the case in the Patent Office.

Signed and sealed this 22nd day of December, A. D. 1931.

M. J. Moore,
Acting Commissioner of Patents.

(Seal)